US012578194B2

(12) United States Patent
Chen et al.

(10) Patent No.: US 12,578,194 B2
(45) Date of Patent: Mar. 17, 2026

(54) POSITIONING AND ORIENTATION METHOD, APPARATUS, AND DEVICE

(71) Applicant: Huawei Technologies Co., Ltd., Shenzhen (CN)

(72) Inventors: Dongyang Chen, Shenzhen (CN); Jinghui Xu, Shenzhen (CN); Shihao Tang, Wuhan (CN); Zhiwu Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/785,262

(22) Filed: Jul. 26, 2024

(65) Prior Publication Data

US 2024/0384993 A1 Nov. 21, 2024

Related U.S. Application Data

(63) Continuation of application No. PCT/CN2022/135173, filed on Nov. 29, 2022.

(30) Foreign Application Priority Data

Jan. 29, 2022 (CN) .......................... 202210111699.3

(51) Int. Cl.
*G01C 21/16* (2006.01)
(52) U.S. Cl.
CPC .................................... *G01C 21/16* (2013.01)
(58) Field of Classification Search
CPC .................................................... G01C 21/16
See application file for complete search history.

(56) References Cited

U.S. PATENT DOCUMENTS

2002/0055819 A1 5/2002 Shimizu et al.

FOREIGN PATENT DOCUMENTS

| | | |
|---|---|---|
| CN | 102661162 A | 9/2012 |
| CN | 103912294 A | 7/2014 |
| CN | 103968856 A | 8/2014 |
| CN | 105371871 A | 3/2016 |
| CN | 105783912 A | 7/2016 |
| CN | 106168139 A | 11/2016 |
| CN | 108957405 A | 12/2018 |
| CN | 111897321 A | 11/2020 |
| CN | 111927518 A | 11/2020 |

OTHER PUBLICATIONS

Anonymous, "Transfer alignment", URL:https://en.wikipedia.org/w/index.php?title=Transfer_alignmentandoldid=995322394, Wikipedia, Dec. 20, 2020, XP093251754, total 1 page.

*Primary Examiner* — Mathew Franklin Gordon
(74) *Attorney, Agent, or Firm* — Slater Matsil, LLP

(57) ABSTRACT

A method includes the following steps: obtaining a first status of an object, where the first status includes a first position and a first pose; obtaining a second status of the object through inertial navigation by using the first status as a start point, where the second status includes a second position and a second pose; obtaining a third pose of the object through initial alignment; and providing inertial navigation for the object by using the third pose and the second position as a start point. A positioning and orientation apparatus and a positioning and orientation device are further provided. The second pose is replaced with the third pose obtained through initial alignment.

20 Claims, 5 Drawing Sheets

Obtain a first status of an object, where the first status includes a first position and a first pose — 101

Obtain a second status of the object through inertial navigation by using the first status as a start point, where the second status includes a second position and a second pose — 102

Obtain a third pose of the object through initial alignment — 103

Provide inertial navigation for the object by using the third pose and the second position as a start point — 104

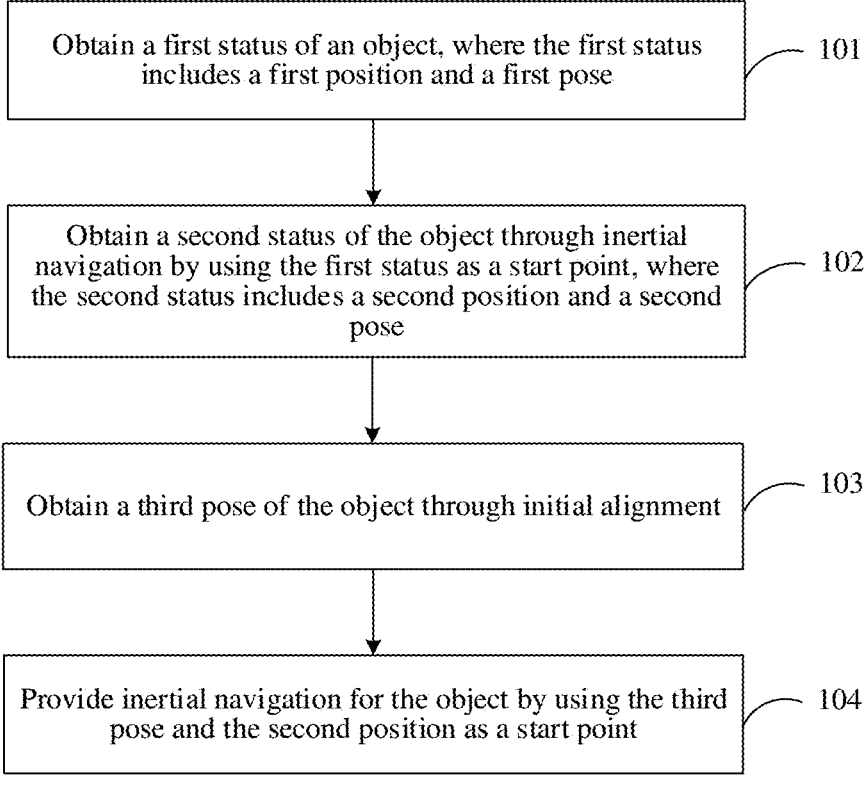

Obtain a first status of an object, where the first status includes a first position and a first pose — 101

Obtain a second status of the object through inertial navigation by using the first status as a start point, where the second status includes a second position and a second pose — 102

Obtain a third pose of the object through initial alignment — 103

Provide inertial navigation for the object by using the third pose and the second position as a start point — 104

FIG. 1

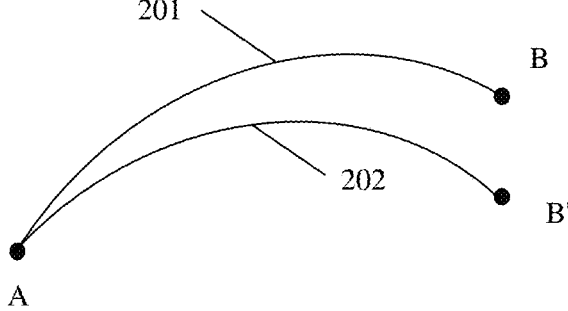

FIG. 2

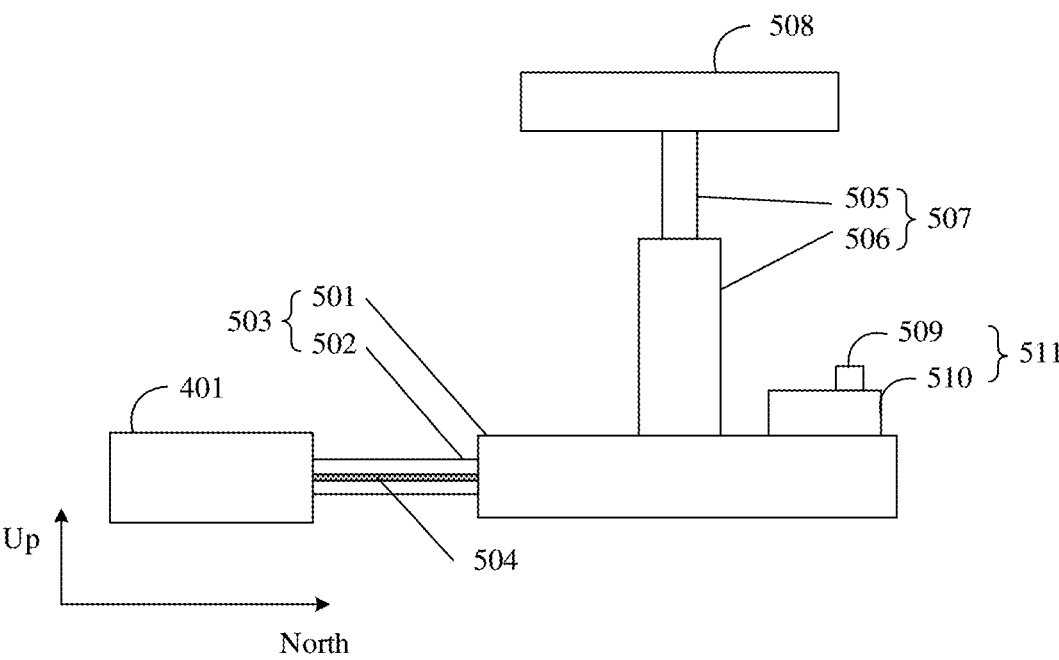

FIG. 5

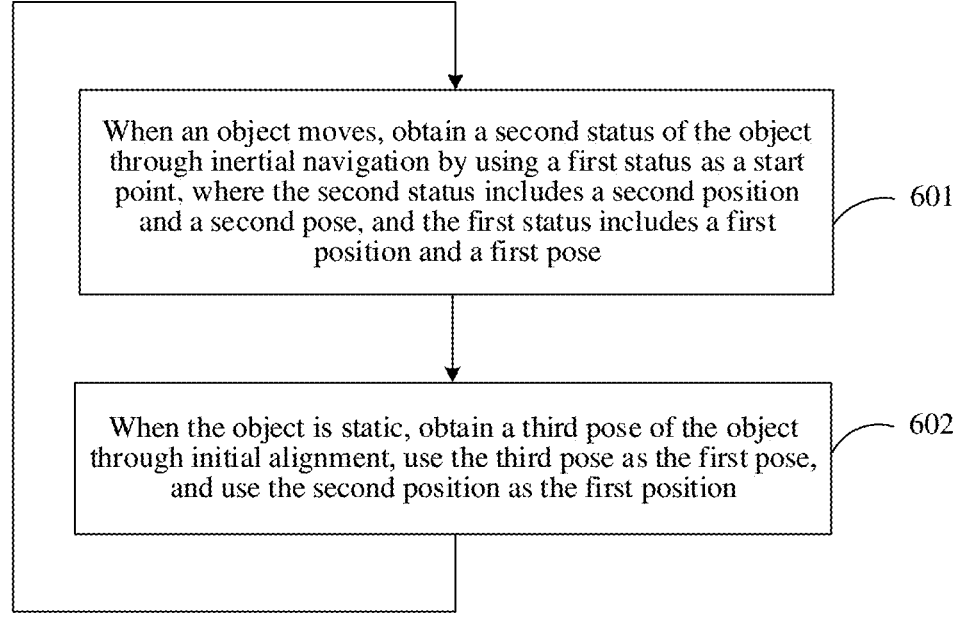

When an object moves, obtain a second status of the object through inertial navigation by using a first status as a start point, where the second status includes a second position and a second pose, and the first status includes a first position and a first pose — 601

When the object is static, obtain a third pose of the object through initial alignment, use the third pose as the first pose, and use the second position as the first position — 602

FIG. 6

POSITIONING AND ORIENTATION METHOD, APPARATUS, AND DEVICE

CROSS-REFERENCE TO RELATED APPLICATIONS

This application is a continuation of International Application No. PCT/CN2022/135173, filed on Nov. 29, 2022, which claims priority to Chinese Patent Application No. 202210111699.3, filed on Jan. 29, 2022. The disclosures of the aforementioned applications are hereby incorporated by reference in their entireties.

TECHNICAL FIELD

This application relates to the positioning and orientation field, and in particular, to a positioning and orientation method, apparatus, and device.

BACKGROUND

A global positioning system (GPS) is a positioning and orientation system for high-precision radio navigation based on artificial earth satellites. The GPS can provide accurate position and pose information for vehicles, mobile phones, or the like.

However, in some scenarios, the GPS may not be able to provide position and pose information for vehicles, mobile phones, or the like, for example, a mine, a tunnel, or an indoor area. In this case, an object may be positioned and oriented by using an inertial navigation technology. Specifically, an inertial measurement unit (IMU) may obtain an angular velocity and an acceleration of the object. The acceleration may be used to calculate displacement information of the object relative to an initial position. The angular velocity may be used to calculate pose change information of the object relative to an initial pose. A latest pose of the object may be obtained by using the pose change information and the initial pose. A latest position of the object may be obtained by using the initial position, the displacement information, the initial pose, and the pose change information.

However, the IMU has an error such as zero offset or random walk. The error accumulates over time. The error accumulated over time reduces accuracy of positioning and orientation.

SUMMARY

This application provides a positioning and orientation method. A second pose is replaced with a third pose obtained through initial alignment, so that accuracy of positioning and orientation can be improved.

A first aspect of this application provides a positioning and orientation method. The positioning and orientation method may be applied to a positioning and orientation device. The positioning and orientation device is referred to as a device for short. The positioning and orientation method includes the following steps: The device obtains a first status of an object. The first status includes a first position and a first pose. The first position includes information about one or more of three translational degrees of freedom. In one description, the three translational degrees of freedom include X-axis translation, Y-axis translation, and Z-axis translation. The first pose includes information about one or more of three rotational degrees of freedom. In one description, the three rotational degrees of freedom include X-axis rotation, Y-axis rotation, and Z-axis rotation. The device obtains a second status of the object through inertial navigation by using the first status as a start point. The second status includes a second position and a second pose. The device obtains a third pose of the object through initial alignment. The device provides inertial navigation for the object by using the third pose and the second position as a start point. Specifically, the device obtains a third status of the object through inertial navigation by using the third pose and the second position as a start point. The third status includes a fourth position and a fourth pose.

In this application, the second pose carries an error accumulated over time. The second pose is calibrated through initial alignment, so that accuracy of positioning and orientation can be improved.

In an optional manner of the first aspect, when the object moves at a first speed, the device obtains the second status of the object through inertial navigation by using the first status as the start point, and when the object moves at a second speed, the device obtains the third pose of the object through initial alignment. The second speed is less than the first speed. When a moving speed of the object is relatively low, the third pose may be obtained through coarse alignment in initial alignment. In this case, the device does not need to depend on an external positioning device. The positioning device includes a satellite and the like. Therefore, in this application, costs of positioning and orientation can be reduced.

In an optional manner of the first aspect, the device obtains the third pose of the object through initial alignment when the object is static, and when the object moves, the device obtains the second status of the object through inertial navigation by using the first status as the start point. A lower moving speed of the object indicates a more accurate third pose obtained through coarse alignment. Therefore, initial alignment is completed when the object is static, so that accuracy of the third pose can be improved, thereby improving accuracy of positioning and orientation.

In an optional manner of the first aspect, when the object is static, moves in a non-linear manner, or moves at a non-uniform speed, the device obtains the third pose of the object through initial alignment.

In an optional manner of the first aspect, the positioning and orientation method further includes the following steps: The device corrects the second position by using the third pose and the first pose, to obtain a third position, or the device corrects the second position by using the third pose, to obtain the third position; and the device provides inertial navigation for the object by using the third pose and the third position as a start point. The second position also carries an error accumulated over time. The second position is corrected by using the third pose and the first pose or by using the third pose, so that accuracy of positioning and orientation can be improved.

In an optional manner of the first aspect, the positioning and orientation method further includes the following steps: The device obtains displacement information of the object from the first position to the second position; and the device corrects the second position by using the third pose, the first pose, and the displacement information, to obtain the third position. The second position is corrected by using the third pose, the first pose, and the displacement information, so that accuracy of positioning and orientation can be improved.

In an optional manner of the first aspect, the positioning and orientation method further includes the following steps: The device obtains a track of the object from the first position to the second position; and the device corrects the track based on the displacement information. In a period from the first position to the second position, a moving track of the object also carries an error accumulated over time. The track is corrected by using the displacement information, so that accuracy of the track can be improved, thereby improving accuracy of positioning and orientation.

In an optional manner of the first aspect, the positioning and orientation method further includes the following steps: The device obtains a track of the object from the first position to the second position; and the device corrects the track based on the third pose and the first pose; or the device corrects the track based on the third pose. In a period from the first position to the second position, a moving track of the object also carries an error accumulated over time. The track is corrected by using the third pose and the first pose or by using the third pose, so that accuracy of the track can be improved, thereby improving accuracy of positioning and orientation.

In an optional manner of the first aspect, the device performs initial alignment by using an IMU, to obtain the third pose of the object. The IMU is mounted on a motion unit. The IMU is static relative to the motion unit. The motion unit is mounted on the object. When the object is static, the motion unit moves relative to the object. When both the object and the IMU are static, accuracy of the third pose obtained through coarse alignment is low. Therefore, accuracy of initial alignment can be improved by adding the motion unit, thereby improving accuracy of positioning and orientation.

In an optional manner of the first aspect, the motion unit is static relative to the object when the object moves. Therefore, in this application, energy consumption can be reduced. In addition, when the motion unit and the object move at the same time, a positioning and orientation algorithm is more complex. Therefore, in this application, processing resources can be saved.

In an optional manner of the first aspect, the positioning and orientation method further includes the following step: The device obtains first information by using the IMU. The first information represents that the object is in a moving state or a static state. In another manner, the first information may be used by the device to determine whether to perform inertial navigation or initial alignment. The device may alternatively obtain the first information from a sensor. The sensor is mounted on a moving mechanism of the object. Compared with a solution of the sensor, this application can reduce costs of positioning and orientation.

In an optional manner of the first aspect, the positioning and orientation method further includes the following steps: When the first information represents that the object is in the moving state, the device controls the motion unit to be static; or when the first information represents that the object is in the static state, the device controls the motion unit to move. In another manner, the device may obtain a status of the object from a motion sensor. The motion sensor is mounted on a moving mechanism of the object. Compared with a solution of the sensor, this application can reduce costs of positioning and orientation.

In an optional manner of the first aspect, the device obtains the third pose of the object by using a multi-position method and a continuous rotation method in gyro north-seeking. Compared with a single-position method, the multi-position method and the continuous rotation method can improve accuracy of initial alignment, thereby improving accuracy of positioning and orientation.

A second aspect of this application provides a positioning and orientation apparatus. The positioning and orientation apparatus includes a first obtaining module, a second obtaining module, a third obtaining module, and an inertial navigation module. The first obtaining module is configured to obtain a first status of an object. The first status includes a first position and a first pose. The second obtaining module is configured to obtain a second status of the object through inertial navigation by using the first status as a start point. The second status includes a second position and a second pose. The third obtaining module is configured to obtain a third pose of the object through initial alignment. The inertial navigation module is configured to provide inertial navigation for the object by using the third pose and the second position as a start point.

In an optional manner of the second aspect, the second obtaining module is configured to: when the object moves at a first speed, obtain the second status of the object through inertial navigation by using the first status as a start point. The third obtaining module is configured to: when the object moves at a second speed, obtain the third pose of the object through initial alignment, where the second speed is less than the first speed.

In an optional manner of the second aspect, the third obtaining module is configured to obtain the third pose of the object through initial alignment when the object is static. The second obtaining module is configured to: when the object moves, obtain the second status of the object through inertial navigation by using the first status as the start point.

In an optional manner of the second aspect, the positioning and orientation apparatus further includes a first correction module. The first correction module is configured to correct the second position by using the third pose and the first pose or by using the third pose, to obtain a third position. The inertial navigation module is configured to provide inertial navigation for the object by using the third pose and the third position as a start point.

In an optional manner of the second aspect, the first obtaining module is further configured to obtain displacement information of the object from the first position to the second position. The correction module is configured to correct the second position by using the third pose, the first pose, and the displacement information, to obtain the third position.

In an optional manner of the second aspect, the first obtaining module is further configured to obtain a track of the object from the first position to the second position. The positioning and orientation apparatus further includes a first correction module. The first correction module is configured to correct the track based on the displacement information.

In an optional manner of the second aspect, the first obtaining module is further configured to obtain a track of the object from the first position to the second position. The positioning and orientation apparatus further includes a second correction module. The second correction module is configured to correct the track based on the third pose and the first pose or based on the third pose.

In an optional manner of the second aspect, the third obtaining module is configured to perform initial alignment by using an IMU, to obtain the third pose of the object. The IMU is mounted on a motion unit. The IMU is static relative to the motion unit. The motion unit is mounted on the object. When the object is static, the motion unit moves relative to the object.

In an optional manner of the second aspect, the motion unit is static relative to the object when the object moves.

In an optional manner of the second aspect, the first obtaining module is further configured to obtain first information by using the IMU, where the first information represents that the object is in a moving state or a static state.

In an optional manner of the second aspect, the positioning and orientation apparatus further includes a control module. The control module is configured to: when the first information represents that the object is in the moving state, control the motion unit to be static. The control module is further configured to: when the first information represents that the object is in the static state, control the motion unit to move.

In an optional manner of the second aspect, the third obtaining module is configured to obtain the third pose of the object by using a multi-position method and a continuous rotation method in gyro north-seeking.

A third aspect of this application provides a positioning and orientation device. The device includes a processor and an IMU. The processor is configured to obtain a first status of an object. The first status includes a first position and a first pose. The IMU is configured to provide inertial navigation for the object by using the first status as a start point, to obtain inertial navigation data. The processor is further configured to obtain a second status of the object based on the inertial navigation data and the first status. The second status includes a second position and a second pose. The IMU is further configured to obtain a third pose of the object through initial alignment. The IMU is further configured to provide inertial navigation for the object by using the third pose and the second position as a start point.

In an optional manner of the third aspect, the IMU is configured to: when the object moves at a first speed, provide inertial navigation for the object by using the first status as the start point, to obtain the inertial navigation data. The IMU is configured to: when the object moves at a second speed, obtain the third pose of the object through initial alignment. The second speed is less than the first speed.

In an optional manner of the third aspect, the IMU is configured to obtain the third pose of the object through initial alignment when the object is static. The IMU is configured to: when the object moves at the first speed, provide inertial navigation for the object by using the first status as the start point, to obtain the inertial navigation data.

In an optional manner of the third aspect, the processor is further configured to correct the second position by using the third pose and the first pose or by using the third pose, to obtain a third position. The IMU is configured to provide inertial navigation for the object by using the third pose and the third position as a start point.

In an optional manner of the third aspect, the processor is further configured to obtain displacement information of the object from the first position to the second position. The processor is configured to correct the second position by using the third pose, the first pose, and the displacement information, to obtain the third position.

In an optional manner of the third aspect, the processor is further configured to obtain a track of the object from the first position to the second position. The processor is configured to correct the track based on the displacement information.

In an optional manner of the third aspect, the processor is further configured to obtain a track of the object from the first position to the second position. The processor is further configured to correct the track based on the third pose and the first pose or based on the third pose.

In an optional manner of the third aspect, the device further includes a motion unit. The IMU is mounted on the motion unit. The IMU is static relative to the motion unit. The motion unit is mounted on the object. When the object is static, the motion unit moves relative to the object.

In an optional manner of the third aspect, the motion unit is static relative to the object when the object moves.

In an optional manner of the third aspect, the IMU is further configured to obtain first information, where the first information represents that the object is in a moving state or a static state.

In an optional manner of the third aspect, the processor is further configured to: when the first information represents that the object is in the moving state, control the motion unit to be static. The processor is further configured to: when the first information represents that the object is in the static state, control the motion unit to move.

In an optional manner of the third aspect, the IMU is configured to obtain the third pose of the object by using a multi-position method and a continuous rotation method in gyro north-seeking.

A fourth aspect of this application provides a computer storage medium. The computer storage medium stores instructions, and when the instructions are executed on a computer, the computer is enabled to perform the method according to the first aspect or any implementation of the first aspect.

A fifth aspect of this application provides a computer program product. When the computer program product is executed on a computer, the computer is enabled to perform the method according to the first aspect or any implementation of the first aspect.

BRIEF DESCRIPTION OF THE DRAWINGS

FIG. 1 is a first schematic flowchart of a positioning and orientation method according to an embodiment of this application;

FIG. 2 is a schematic diagram of a structure of track correction according to an embodiment of this application;

FIG. 5 is a schematic diagram of a structure of a hydraulic support according to an embodiment of this application;

FIG. 6 is a second schematic flowchart of a positioning and orientation method according to an embodiment of this application;

DETAILED DESCRIPTION OF ILLUSTRATIVE EMBODIMENTS

Figure 3:
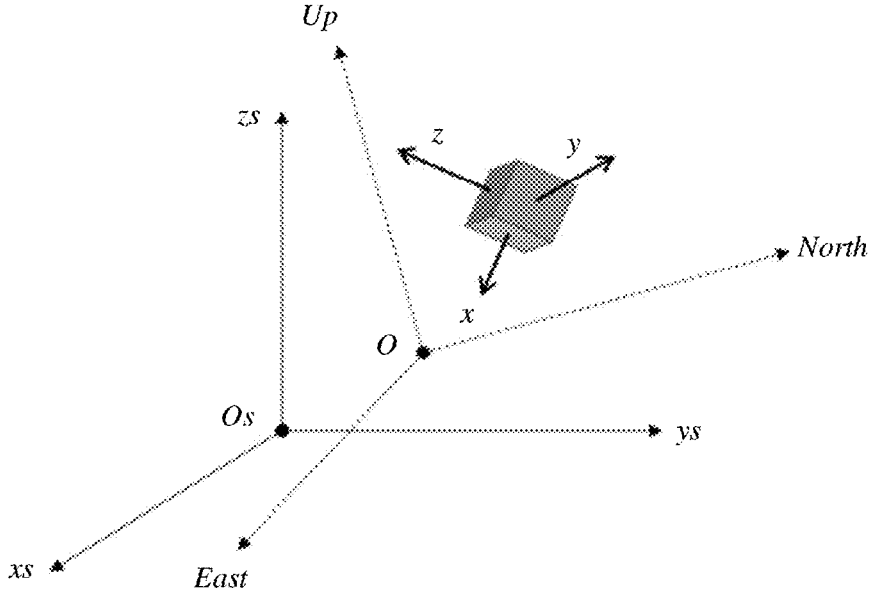
FIG. 3 is a schematic diagram of a structure of three coordinate systems according to an embodiment of this application.

This application provides a positioning and orientation method, apparatus, and device. A second pose is replaced with a third pose obtained through initial alignment, so that accuracy of positioning and orientation can be improved. It should be understood that "first", "second", and the like used in this application are merely used for a purpose of distinguishing for description, and shall not be understood as an indication or implication of relative importance or an indication or implication of a sequence. In addition, for brevity and clarity, reference numbers and/or letters are repeated in a plurality of accompanying drawings of this application. Repetition is not indicative of a strict limiting relationship between various embodiments and/or configurations. Unless otherwise specified, moving or being static in this application means moving or being static relative to the earth.

The positioning and orientation method provided in this application is applied to the positioning and orientation field. In the positioning and orientation field, when a GPS cannot provide position information and pose information, a positioning and orientation device may provide inertial navigation for an object by using an IMU. However, the IMU has an error such as zero offset or random walk. The error accumulates over time. The error accumulated over time reduces accuracy of positioning and orientation.

Therefore, this application provides a positioning and orientation method. The positioning and orientation method may be applied to a positioning and orientation device. The positioning and orientation device is referred to as a device for short. FIG. 1 is a first schematic flowchart of a positioning and orientation method according to an embodiment of this application. As shown in FIG. 1, the positioning and orientation method includes the following steps.

In step 101, a device obtains a first status of an object, where the first status includes a first position and a first pose. The first position includes information about one or more of three translational degrees of freedom. The first pose includes information about one or more of three rotational degrees of freedom. In a subsequent example, an example in which the first status includes information about three translational degrees of freedom and information about three rotational degrees of freedom is used for description. The device may obtain the first status in a manner such as initial alignment or manual input. Depending on whether the object moves, initial alignment includes coarse alignment and fine alignment. When the object moves relative to the earth, position information and pose information are obtained through fine alignment. Fine alignment may depend on an external positioning device, such as a GPS satellite. When the object is static or moves slowly relative to the earth, pose information is obtained through coarse alignment. Coarse alignment depends on a gravity vector of the earth and an angular velocity vector of rotation of the earth.

In step 102, the device obtains a second status of the object through inertial navigation by using the first status as a start point. The second status includes a second position and a second pose. Inertial navigation is to measure an acceleration and an angular velocity of the object based on Newton's First Law of Motion by using an IMU. The acceleration may be used to calculate displacement information of the object relative to an initial position. The angular velocity may be used to calculate pose change information of the object relative to an initial pose. A latest second position of the object may be obtained by using the pose change information, the displacement information, the first pose, and the first position. A latest second pose of the object may be obtained by using the pose change information and the first pose.

In step 103, the device obtains a third pose of the object through initial alignment. The third pose includes a yaw angle, a roll angle, and a pitch angle. The yaw angle, the roll angle, and the pitch angle are an expression of three rotational degrees of freedom. Initial alignment includes coarse alignment and fine alignment. Coarse alignment includes methods such as gyro north-seeking and measuring a gravity component of the earth by using an accelerometer. A process in which the device obtains the yaw angle is described below by using a single-position method in gyro north-seeking as an example. The IMU includes three gyroscopes and three accelerometers. A horizontal-axis gyroscope in the three gyroscopes measures two projection values of a rotational speed of the earth. One projection value includes an angular velocity value that is obtained after an angular velocity of rotation of the earth is projected to any point on a surface of the earth and that points to a direction of the north pole (e.g., a north orientation). Another projection value includes a value obtained after an angular velocity value of the north orientation is further projected to a sensitive axis of the horizontal-axis gyroscope. A first projection passes through an angle of latitude, and a second projection passes through an azimuth angle (e.g., an included angle between the sensitive axis of the horizontal-axis gyroscope and the north orientation). The angle of latitude and the azimuth angle may be obtained by solving the two projection values. The yaw angle of the object may be calculated by using the azimuth angle. In a geographic coordinate system, the azimuth angle is equal to the yaw angle.

The device may obtain the roll angle and the pitch angle by using a horizontal-axis accelerometer in the three accelerometers. Specifically, the device measures a gravitational acceleration component of the earth by using the horizontal-axis accelerometer. The acceleration component is an acceleration value obtained after a local gravitational acceleration is projected to a sensitive axis of the horizontal-axis accelerometer by using the roll angle and the pitch angle. The roll angle and the pitch angle may be obtained by solving this acceleration value. When the object is parallel to a horizontal plane, the roll angle and the pitch angle are o.

It should be understood that the foregoing is merely an example description of obtaining the third pose by the device. In actual application, the device may alternatively obtain the third pose in another manner. For example, the device may obtain the yaw angle by using a multi-position method or a continuous rotation method. Compared with a single-position method, the multi-position method and the continuous rotation method can reduce a drift error of the gyroscope, and improve accuracy of the obtained third pose.

It can be learned from the foregoing description that the positioning and orientation method in this application may be applied to a scenario without a GPS. Therefore, in this embodiment of this application, the third pose may be obtained through autonomous alignment. Initial alignment includes autonomous alignment and non-autonomous alignment. Autonomous alignment does not need to depend on an external positioning device. Non-autonomous alignment depends on an external positioning device.

In step 104, the device provides inertial navigation for the object by using the third pose and the second position as a start point. In step 102, the device obtains the second pose of the object through inertial navigation. The second pose carries an error of inertial navigation. In step 103, the device obtains the third pose of the object through initial alignment. The device provides inertial navigation for the object by using the third pose and the second position as a start point. Specifically, the device obtains a third status of the object through inertial navigation by using the third pose and the second position as a start point. The third status includes a fourth position and a fourth pose. For description of inertial navigation, refer to the description in step 102. After obtaining the third status, the device may return to step 103. The device obtains a fifth pose of the object through initial alignment. The device repeatedly performs step 104. In step 104, the device provides inertial navigation for the object by using the fifth pose and the fourth position as a start point. Therefore, in actual application, the device may repeatedly perform step 103 and step 104.

In this application, the device may obtain the third pose by using gyro north-seeking and tilt angle measurement by an accelerometer. The gyro north-seeking and the tilt angle measurement by an accelerometer are both kinematic perception for measuring a characteristic of an object on the earth, and an integral resolving process is not required. Therefore, there is no time cumulative error for the third pose. Therefore, the second pose is calibrated through initial alignment, so that accuracy of positioning and orientation can be improved.

It can be learned from the foregoing description of step 101 that, when the object is static or moves slowly relative to the earth, the device may obtain the third pose through coarse alignment. In this case, the device may not need to depend on an external positioning device. Therefore, the device may perform inertial navigation when a moving speed of the object is relatively high. The device may perform initial alignment when the moving speed of the object is relatively low. Specifically, in step 102, the device may obtain the second status of the object through inertial navigation when the object moves at a first speed. In step 103, the device may obtain the third pose of the object through initial alignment when the object moves at a second speed. The second speed is less than the first speed. It should be understood that the first speed or the second speed may be a speed range.

It can be learned from the foregoing description of step 101 that, when the object is static, accuracy of the third pose obtained through coarse alignment is higher. Therefore, the device may perform inertial navigation when the object moves. The device may perform initial alignment when the object is static. Specifically, in step 102, the device obtains the third pose of the object through initial alignment when the object is static. In step 101, when the object moves, the device obtains the second status of the object through inertial navigation.

It should be understood that, when the object moves, that the device obtains the second status of the object through inertial navigation does not necessarily mean that the device obtains the second status when the object moves. For example, the object is in a moving state in a first time period. The device provides inertial navigation for the object in the first time period by using the IMU. The IMU outputs inertial navigation data at an end moment of the first time period. The object is static in a second time period. The second time period is connected to the first time period. The second time period is after the first time period. In the second time period, the device obtains the second status by using the first status and the inertial navigation data. In this case, a state of the object is static.

It can be learned from the foregoing description that the device may perform inertial navigation when the object is moving, and perform initial alignment when the object is static. In this case, the device needs to obtain information about whether the object is in a static state or a moving state. In actual application, the device may obtain the information in the following several manners. In one manner, the object has a motion part, such as a cylinder, a motor, or a wheel. A sensor is mounted on the motion part. The device determines, based on information about the sensor, that the object is in a static state or a moving state. In another manner, the object has a controller that controls motion of the motion part. The motion part moves or is static based on a control signal of the controller. In this case, the device may receive the control signal from the controller. The device determines, based on the control signal, that the object is in a static state or a moving state. In another manner, the IMU outputs first information. The device determines, based on the first information, that the object is in a static state or a moving state.

In the foregoing step 102, the device obtains the second pose and the second position. The second position may also carry an error accumulated over time. Therefore, the device may correct the second position. For example, the device may correct the second position based on the third pose and the first pose or based on the third pose, to obtain the third position. In one manner, a correction algorithm may be a forward-backward smoothing algorithm. The forward-backward smoothing algorithm includes a forward filter and a backward filter. The forward filter is standard Kalman filtering. The backward filter is Kalman filtering that works from back to front in time. A result of smoothing estimation is a weighted combination of two filtering results.

After obtaining the third position, in step 104, the device provides inertial navigation for the object by using the third pose and the third position as a start point. It should be understood that the foregoing correction algorithm is merely one or more examples. For example, a neural network model is mounted on the device. After the third pose, the first pose, and the first position are input, the neural network model outputs the third position.

In actual application, to improve accuracy of the third position, the device may obtain displacement information of the object from the first position to the second position. For example, a sensor is mounted on the motion part of the object. The sensor uploads the displacement information of the object. The device corrects the second position by using the third pose, the first pose, and the displacement information, to obtain the third position.

It can be learned from the foregoing description that the device may correct the second position by using the third pose. However, in some scenarios, a user further needs to pay attention to a moving track of the object. Because the second position may carry an error, a track of the object from the first position to the second position may also carry an error. The device can correct the moving track of the object. For example, FIG. 2 is a schematic diagram of a structure of track correction according to an embodiment of this application. As shown in FIG. 2, a point A is the first position of the object, a point B is the second position of the object, and B' is the third position. An original moving track of the object is a track 201. After the track 201 is corrected, the device obtains a track 202. The device may correct the track based on one or more pieces of content in the third pose, the first pose, or the displacement information. A specific algorithm used by the device to correct the track is not limited in this embodiment of this application.

It can be learned from the foregoing description that, to improve accuracy of the obtained third pose, the device may obtain the third pose when the object is static. To further improve accuracy of the obtained third pose, the IMU may move relative to the object. In this case, the IMU is mounted on a motion unit. The IMU is static relative to the motion unit. The motion unit is mounted on the object. When the object is static, the motion unit moves relative to the object.

For example, the motion unit is a turntable. When the object is static, the motion unit rotates on the object.

When the object moves, the device needs to perform inertial navigation for the object. In this case, the device may not need to obtain the pose information of the object through initial alignment. Therefore, when the object moves, the motion unit may be static relative to the object, thereby reducing energy consumption. In addition, when the motion unit and the object move at the same time, an algorithm used by the device to perform inertial navigation is more complex. Processing resources can be saved by keeping the motion unit static relative to the object.

It can be learned from the foregoing description that the device may determine, in a plurality of manners, that the object is in a static state or a moving state. For example, the device may determine, based on the first information output by the IMU, whether the object is in a static state or a moving state. When the first information represents that the object is in the moving state, the device may control the motion unit to be static. When the first information represents that the object is in the static state, the device may control the motion unit to move.

In the foregoing step 103, the device obtains the third pose of the object through initial alignment. The third pose includes a yaw angle, a roll angle, and a pitch angle in an east-north-up coordinate system. In the east-north-up coordinate system, a north direction of the object, an east direction of the object, and a direction of the object pointing to the sky are used as three axes of the coordinate system. In actual application, the third pose may be pose information in any customized coordinate system. Therefore, the device may convert a third pose in the east-north-up coordinate system into any customized coordinate system. FIG. 3 is a schematic diagram of a structure of three coordinate systems according to an embodiment of this application. As shown in FIG. 3, three axes of a customized coordinate system are xs, ys, and zs. Three axes of a coordinate system of the object are x, y, and z. Three axes of the east-north-up coordinate system are east, north, and up. In the east-north-up coordinate system, the object rotates around the up axis as a yaw angle. The object rotates around the east axis as a pitch angle. The object rotates around the north axis as a roll angle. In the foregoing step 103, the device determines the yaw angle, the roll angle, and the pitch angle of the object in the east-north-up coordinate system. The device obtains an included angle between the customized coordinate system and the east-north-up coordinate system. By using a pose conversion formula and the included angle, the device may convert a position and a pose of the object in the east-north-up coordinate system into the customized coordinate system.

In the foregoing step 102, the device may obtain a first included angle between a projection of the y-axis of the object in a north-east plane and the north axis. The north-east plane is a plane formed by the east axis and the north axis. The device may obtain a second included angle between a projection of the y-axis of the object in an east-up plane and the east axis. The device may obtain a third included angle between a projection of the y-axis of the object in a north-up plane and the up axis. The first included angle corresponds to the yaw angle of the object in the east-north-up coordinate system. The second included angle corresponds to the pitch angle of the object in the east-north-up coordinate system. The third included angle corresponds to the roll angle of the object in the east-north-up coordinate system. Similarly, the device may also obtain the yaw angle, the pitch angle, and the roll angle of the object in the east-north-up coordinate system based on a projection of the x-axis or the z-axis of the object.

Figure 4:
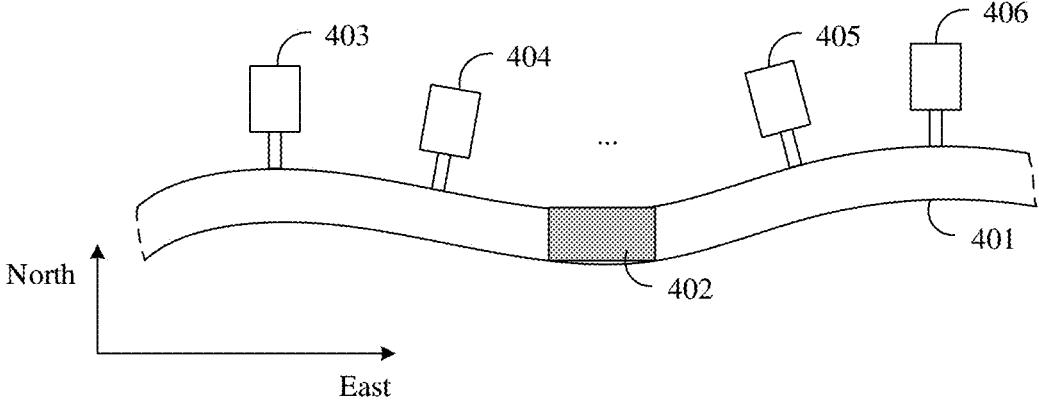
FIG. 4 is a schematic diagram of a structure of a mine according to an embodiment of this application.

The positioning and orientation method in this application may be applied to a mine, a tunnel, an indoor area, or the like. A mine is used as an example below to describe the positioning and orientation method provided in this application. FIG. 4 is a schematic diagram of a structure of a mine according to an embodiment of this application. As shown in FIG. 4, a scraper transporter 401, a coal mining machine 402, and hydraulic supports 403 to 406 are included in the mine. The scraper transporter 401 is also referred to as a rail. The hydraulic supports 403 to 406 are configured to push the scraper transporter 401, so that a position of the scraper transporter 401 changes.

FIG. 5 is a schematic diagram of a structure of a hydraulic support according to an embodiment of this application. As shown in FIG. 5, the hydraulic support includes a first motion part 503, a second motion part 507, a top plate 508, and a sensor 504. The first motion part 503 includes a first push rod 502 and a first support 501. The first push rod 502 may stretch and retract relative to the first support 501. The second motion part 507 includes a second push rod 505 and a second support 506. The second push rod 505 may stretch and retract relative to the second support 506. The top plate 508 is mounted on the second push rod 505. The second support 506 is mounted on the first support 501. The first push rod 502 is connected to the scraper transporter 401. A positioning and orientation device 511 is mounted on the first support 501. The positioning and orientation device 511 includes an IMU 509, a motion unit 510, and a processor (not shown in the figure). The sensor 504 is mounted on the first push rod 502 or the first support 501.

The hydraulic support may push or pull the scraper transporter 401, so that a position of the scraper transporter 401 changes. The following is described by using an example in which the hydraulic support pushes the scraper transporter 401, so that the scraper transporter 401 moves southward. The hydraulic support includes the following five actions. The five actions include supporting, pushing while supporting, lowering the support, moving the support, and lifting the support.

During supporting, the first push rod 502 is in a retracted state, and the second push rod 505 is in a stretched state. In this case, the top plate 508 is in contact with an upper wall (not shown in the figure), and the first support 501 is in contact with a lower wall (not shown in the figure). The hydraulic support is under force and cannot move normally in the north axis and the east axis. During sliding while supporting, the first push rod 502 changes from the retracted state to the stretched state. The first push rod 502 pushes the scraper transporter 401 to move southward. In this case, the second push rod 505 is still in the stretched state. When the support is being lowered, the second push rod 505 changes from the stretched state to the retracted state. When the support is being moved, the first push rod 502 changes from the stretched state to the retracted state. In this case, because the second push rod 505 is in the retracted state, the hydraulic support may move in a direction of the north axis and a direction of the east axis. The first push rod 502 pulls the hydraulic support to move southward. When the support is being lifted, the second push rod 505 changes from the retracted state to the stretched state. In this case, the first push rod 502 is in the retracted state. If the foregoing five actions are repeatedly performed in sequence, the hydraulic support may continuously push or pull the scraper transporter 401 to move southward.

In the foregoing five actions, when the support is being moved, the first support 501 is in a moving state. The first support 501 is in a static state during supporting, pushing while supporting, lowering the support, or lifting the support. The first support 501 may be used as the object in the foregoing positioning and orientation method. FIG. 6 is a second schematic flowchart of a positioning and orientation method according to an embodiment of this application. As shown in FIG. 6, the positioning and orientation method includes the following steps.

In step 601, when an object moves, a device obtains a second status of the object through inertial navigation by using a first status as a start point. The second status includes a second position and a second pose. The first status includes a first position and a first pose. It can be learned from the foregoing description that the device may determine, in a plurality of manners, that the object is in a static state or a moving state. For example, the device may determine, based on first information of an IMU, whether the object is in a static state or a moving state. The first information may include acceleration measurement data and/or angular velocity measurement data of the IMU. When the first information meets a specific condition, the device determines that the object is in a static state or a moving state. For example, when a root mean square of the acceleration measurement data is less than a threshold, the device determines that the object is in a static state. When the root mean square of the acceleration measurement data is greater than or equal to the threshold, the device determines that the object is in a moving state. A value of the threshold may be determined by a performance parameter of an accelerometer or a gyroscope in the IMU. When the first support 501 is in a moving state, the motion unit 510 is static relative to the first support 501. Each time step 601 is performed, an IMU 509 returns to a same initial position. For description of obtaining the first status by the device, refer to the description of step 101 in FIG. 1. For description of inertial navigation, refer to the description of step 102 in FIG. 1.

In step 602, the device obtains a third pose of the object through initial alignment when the object is static. The device uses the third pose as the first pose, and uses the second position as the first position. It can be learned from the foregoing description that the device may obtain the third pose by using a multi-position method. A four-position method is used as an example for description. The motion unit 510 may drive the IMU 509 to move relative to the first support 501. Therefore, when the IMU 509 is located at four mutually orthogonal positions, the device separately obtains acceleration measurement data and angular velocity measurement data that are output by the IMU 509. The device obtains the third pose based on the acceleration measurement data and the angular velocity measurement data. The third pose includes a yaw angle, a roll angle, and a pitch angle. The device may also obtain the third pose by using a continuous rotation method. For example, when the motion unit 510 is a turntable, the turntable rotates at a uniform speed. In an interval in which the turntable rotates at a uniform speed, the IMU 509 continuously outputs the acceleration measurement data and the angular velocity measurement data. The device obtains the third pose based on the acceleration measurement data and the angular velocity measurement data. For description of obtaining, by the device, the third pose through initial alignment, refer to the description of step 103 in FIG. 1. The device uses the third pose as the first pose, and uses the second position as the first position. Return to step 601.

It should be understood that, when the multi-position method is used, the motion unit 510 may move relative to the first support 501 at intervals. For example, in a first time period, the IMU 509 is in the first position. In a second time period, the motion unit 510 rotates the IMU 509 from the first position to the second position. In a third time period, the IMU 509 is in the second position. In a fourth time period, the motion unit 510 rotates the IMU 509 from the second position to the third position. In a fifth time period, the IMU 509 is in the third position. In a sixth time period, the motion unit 510 rotates the IMU 509 from the third position to a fourth position. In a seventh time period, the IMU 509 is in the fourth position. In an eighth time period, the motion unit 510 rotates the IMU 509 from the fourth position to the first position. The IMU 509 separately outputs the acceleration measurement data and the angular velocity measurement data in four different positions. The four positions include the first position, the second position, the third position, and the fourth position.

It can be learned from the foregoing description that the device may obtain displacement information from the first position to the second position. For example, in FIG. 5, the sensor 504 is mounted on the first push rod 502 or the first support 501. Therefore, the sensor 504 may obtain displacement information of the first support 501 that is obtained when the first support 501 moves. The device corrects the second position or a track based on the displacement information.

It should be understood that, in FIG. 5, the positioning and orientation device 511 may be alternatively mounted on the top plate 508. In this case, the top plate 508 may be used as an object that needs to be positioned and oriented. In the foregoing five actions, the top plate 508 is in a moving state during lowering the support, moving the support, or lifting the support. The top plate 508 is in a static state during supporting or pushing while supporting.

Figure 7:
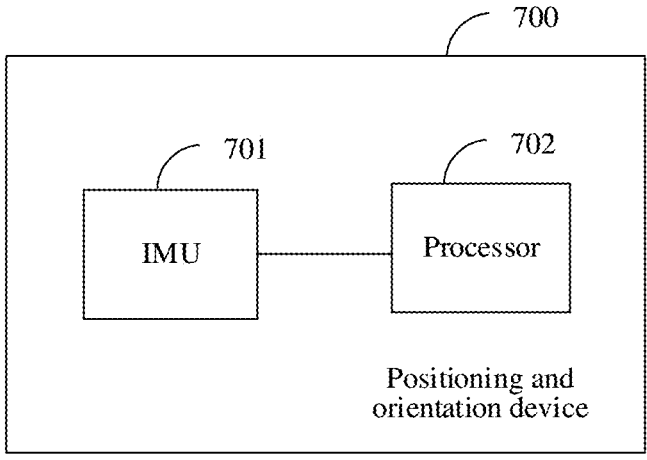
FIG. 7 is a first schematic diagram of a structure of a positioning and orientation device according to an embodiment of this application.

The positioning and orientation method in this application is described above, and a positioning and orientation device in this application is described below. FIG. 7 is a first schematic diagram of a structure of a positioning and orientation device according to an embodiment of this application. As shown in FIG. 7, a positioning and orientation device 700 includes an IMU 701 and a processor 702.

The processor 702 may be a central processing unit (CPU), a network processor (NP), or a combination of a CPU and an NP. The processor 702 may further include a hardware chip or another general-purpose processor. The foregoing hardware chip may be an application specific integrated circuit (ASIC), a programmable logic device (PLD), or a combination of the ASIC and the PLD.

The processor 702 is configured to obtain a first status of an object. The first status includes a first position and a first pose. The IMU 701 is configured to provide inertial navigation for the object by using the first status as a start point, to obtain inertial navigation data. The processor 702 is further configured to obtain a second status of the object based on the inertial navigation data and the first status. The second status includes a second position and a second pose. The IMU 701 is further configured to obtain a third pose of the object through initial alignment. The IMU 701 is further configured to provide inertial navigation for the object by using the third pose and the second position as a start point.

In another embodiment, the positioning and orientation device 700 may further include a memory. The memory is configured to store the first pose. The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), a flash memory, or the like. The volatile memory may be a random access memory (RAM).

In another embodiment, the positioning and orientation device 700 may further include a transceiver. The transceiver may be a radio frequency module or an optical transceiver module. The transceiver may be configured to transmit a positioning and orientation result to another device. The positioning and orientation result includes the second pose, the third pose, or the like. The transceiver may be configured to receive the first pose from another device.

Figure 8:
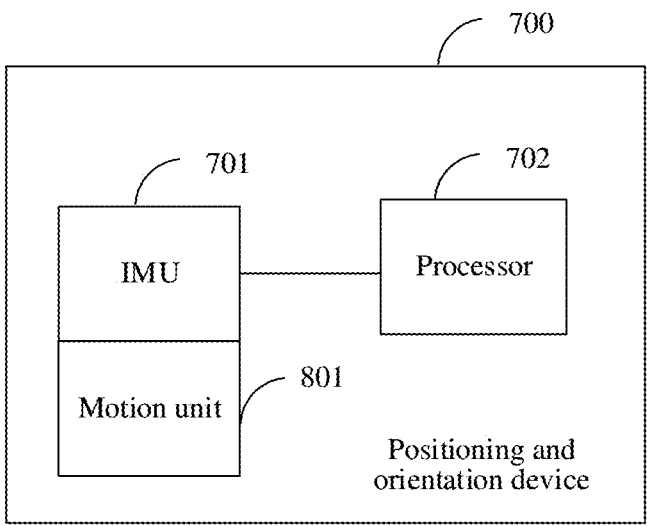
FIG. 8 is a second schematic diagram of a structure of a positioning and orientation device according to an embodiment of this application.

It should be understood that, for description of the positioning and orientation device 700, refer to the foregoing description of the positioning and orientation method. For example, for description of obtaining the first status of the object by the processor 702, refer to the description in step 101. For example, FIG. 8 is a second schematic diagram of a structure of a positioning and orientation device according to an embodiment of this application. As shown in FIG. 8, on the basis of FIG. 7, the positioning and orientation device further includes a motion unit 801. The IMU 701 is mounted on the motion unit 801. The IMU 701 is static relative to the motion unit 801. When the object is static, the motion unit 801 moves relative to the object. When the object moves, the motion unit 801 is static relative to the object.

Figure 9:
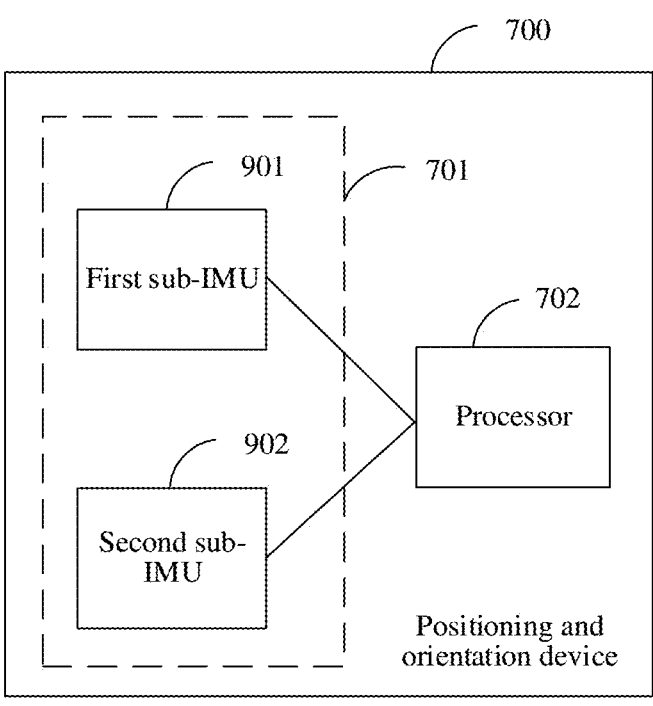
FIG. 9 is a third schematic diagram of a structure of a positioning and orientation device according to an embodiment of this application.

It should be understood that, in actual application, the IMU 701 may include a plurality of sub-IMUs. For example, FIG. 9 is a third schematic diagram of a structure of a positioning and orientation device according to an embodiment of this application. As shown in FIG. 9, on the basis of FIG. 7, the IMU 701 includes a first sub-IMU 901 and a second sub-IMU 902. The first sub-IMU 901 is configured to implement inertial navigation of the object. The second sub-IMU 902 is configured to obtain the third pose through initial alignment. For example, in the positioning and orientation method shown in FIG. 1, the second sub-IMU 902 may be configured to perform step 103, and the second sub-IMU 902 is configured to perform step 104.

It should be understood that, based on the description of step 103, the third pose of the object may be obtained through initial alignment by using only some accelerometers or gyroscopes in the IMU. Therefore, the second IMU 902 may be replaced with another sensor component that can implement initial alignment, thereby reducing costs of the positioning and orientation device.

Figure 10:
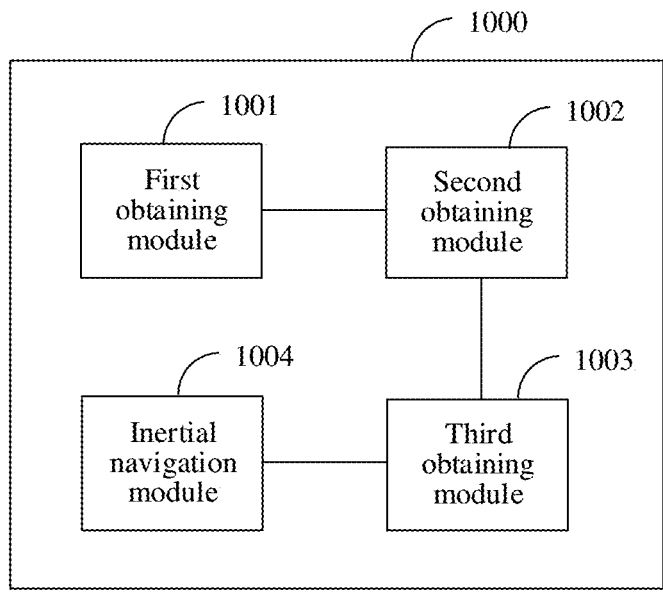
FIG. 10 is a schematic diagram of a structure of a positioning and orientation apparatus according to an embodiment of this application.

The positioning and orientation device in this application is described above, and a positioning and orientation apparatus in this application is described below. FIG. 10 is a schematic diagram of a structure of a positioning and orientation apparatus according to an embodiment of this application. As shown in FIG. 10, a positioning and orientation apparatus 1000 includes a first obtaining module 1001, a second obtaining module 1002, a third obtaining module 1003, and an inertial navigation module 1004. The first obtaining module 1001 is configured to obtain a first status of an object. The first status includes a first position and a first pose. The second obtaining module 1002 is configured to obtain a second status of the object through inertial navigation by using the first status as a start point. The second status includes a second position and a second pose. The third obtaining module 1003 is configured to obtain a third pose of the object through initial alignment. The inertial navigation module 1004 is configured to provide inertial navigation for the object by using the third pose and the second position as a start point.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method, applied to a device, the method comprising:
   obtaining a first status of an object, wherein the first status comprises a first position and a first pose;
   obtaining a second status of the object through inertial navigation based on the first status as a start point, wherein the second status comprises a second position and a second pose;
   obtaining a third pose of the object through initial alignment; and
   providing inertial navigation for the object based on the third pose and based on the second position as a start point.

2. The method according to claim 1, wherein:
   the second status of the object through inertial navigation based on the first status as the start point is obtained when the object moves at a first speed; and
   the third pose of the object through initial alignment is obtained when the object moves at a second speed, wherein the second speed is less than the first speed.

3. The method according to claim 1, wherein:
   the third pose of the object through initial alignment is obtained when the object is static; and
   the second status of the object through inertial navigation based on the first status as the start point is obtained when the object moves.

4. The method according to claim 1, wherein the method further comprises:
   correcting the second position based on the third pose and the first pose or based on the third pose, to obtain a third position; and
   providing inertial navigation for the object based on the third pose and based on the second position as a start point comprises: providing inertial navigation for the object based on the third pose and based on the third position as a start point.

5. The method according to claim 4, wherein the method further comprises:
   obtaining displacement information of the object from the first position to the second position; and
   correcting the second position based on the third pose and the first pose or based on the third pose, to obtain the third position comprises: correcting the second position based on the third pose, the first pose, and the displacement information, to obtain the third position.

6. The method according to claim 5, wherein the method further comprises:
   obtaining a track of the object from the first position to the second position; and
   correcting the track based on the displacement information.

7. The method according to claim 1, wherein the method further comprises:
   obtaining a track of the object from the first position to the second position; and
   correcting the track based on the third pose and the first pose or based on the third pose.

8. The method according to claim 1, wherein:
   obtaining the third pose of the object through initial alignment comprises: performing initial alignment based on an inertial measurement unit (IMU), to obtain the third pose of the object;

the IMU is mounted on a motion unit, and the motion unit is mounted on the object; and when the object is static, the motion unit moves relative to the object.

9. The method according to claim 8, wherein the motion unit is static relative to the object when the object moves.

10. The method according to claim 9, wherein the method further comprises:

obtaining first information based on the IMU, wherein the first information represents that the object is in a moving state or a static state.

11. The method according to claim 10, wherein the method further comprises:

when the first information represents that the object is in the moving state, controlling the motion unit to be static; or when the first information represents that the object is in the static state, controlling the motion unit to move.

12. The method according to claim 1, wherein:

obtaining the third pose of the object through initial alignment comprises obtaining the third pose of the object by using a multi-position method and a continuous rotation method in gyro north-seeking.

13. A device, comprising:

a processor; and an inertial measurement unit (IMU);

wherein the processor is configured to obtain a first status of an object, wherein the first status comprises a first position and a first pose;

wherein the IMU is configured to provide inertial navigation for the object based on the first status as a start point, to obtain inertial navigation data;

wherein the processor is further configured to obtain a second status of the object based on the inertial navigation data and the first status, wherein the second status comprises a second position and a second pose; and wherein the IMU is further configured to obtain a third pose of the object through initial alignment and provide inertial navigation for the object based on the third pose and based on the second position as a start point.

14. The device according to claim 13, wherein the IMU is configured to:

provide inertial navigation for the object based on the first status as the start point, to obtain the inertial navigation data when the object moves at a first speed; and obtain the third pose of the object through initial alignment when the object moves at a second speed, wherein the second speed is less than the first speed.

15. The device according to claim 13, wherein the IMU is configured to:

obtain the third pose of the object through initial alignment when the object is static; and provide inertial navigation for the object by using the first status as the start point, to obtain the inertial navigation data when the object moves.

16. The device according to claim 13, wherein:

the processor is further configured to correct the second position based on the third pose and the first pose or based on the third pose, to obtain a third position; and the IMU is configured to provide inertial navigation for the object based on the third pose and the third position as a start point.

17. The device according to claim 16, wherein the processor is further configured to:

obtain displacement information of the object from the first position to the second position; and correct the second position by using the third pose, the first pose, and the displacement information, to obtain the third position.

18. The device according to claim 17, wherein the processor is further configured to:

obtain a track of the object from the first position to the second position; and correct the track based on the displacement information.

19. The device according to claim 13, wherein the processor is further configured to:

obtain a track of the object from the first position to the second position; and correct the track based on the third pose and the first pose or based on the third pose.

20. The device according to claim 13, wherein the device further includes a motion unit, the IMU is mounted on the motion unit such that the IMU is static relative to the motion unit, and the motion unit is mounted on the object.

* * * * *